(12) United States Patent
Perentes

(10) Patent No.: US 11,641,972 B2
(45) Date of Patent: May 9, 2023

(54) BEVERAGE PREPARATION SYSTEM

(71) Applicant: SOCIETE DES PRODUITS NESTLE S.A., Vevey (CH)

(72) Inventor: Alexandre Perentes, Sullens (CH)

(73) Assignee: Societe des Produits Nestle S.A., Vevey (CH)

( * ) Notice: Subject to any disclaimer, the term of this patent is extended or adjusted under 35 U.S.C. 154(b) by 383 days.

(21) Appl. No.: 16/956,726

(22) PCT Filed: Dec. 19, 2018

(86) PCT No.: PCT/EP2018/085737
§ 371 (c)(1),
(2) Date: Jun. 22, 2020

(87) PCT Pub. No.: WO2019/121848
PCT Pub. Date: Jun. 27, 2019

(65) Prior Publication Data
US 2021/0052104 A1     Feb. 25, 2021

(30) Foreign Application Priority Data
Dec. 22, 2017   (EP) .................................. 17210544

(51) Int. Cl.
*A47J 31/22*     (2006.01)
*A47J 31/44*     (2006.01)

(52) U.S. Cl.
CPC ........... *A47J 31/22* (2013.01); *A47J 31/4492* (2013.01)

(58) Field of Classification Search
CPC .............................. A47J 31/22; A47J 31/4492
(Continued)

(56) References Cited

U.S. PATENT DOCUMENTS

| 4,516,514 A | 5/1985 | Neki et al. |
| 9,868,588 B2 | 1/2018 | Magri et al. |

(Continued)

FOREIGN PATENT DOCUMENTS

| EP | 2853182 | 4/2015 | | |
| WO | WO-2011095518 A2 * | 8/2011 | .......... | A47J 31/0642 |

(Continued)

*Primary Examiner* — Toan C Ly
(74) *Attorney, Agent, or Firm* — K&L Gates LLP

(57) ABSTRACT

There is described a beverage preparation machine comprising a centrifugal brewing unit (2) for preparing a beverage by centrifugation of an ingredient contained in a capsule and mixed with a carrier liquid, the centrifugal brewing unit (2) comprising a centrifugal cell (3) for receiving such a capsule (2A, 2B, 2C); driving means (5) for rotating the centrifugal cell (3); a regulator for regulating a rotation speed of the centrifugal cell (3) by controlling the driving means (5) based on a feedback signal representative of a difference between a desired rotation speed and a measured rotation speed of a capsule (2A, 2B, 2C) rotated in the centrifugal cell (3); the machine further comprising: liquid supply means (6, 4) for supplying carrier liquid to the centrifugal brewing unit (2); an optical reading arrangement (100) for reading a code on a periphery of a capsule (2A, 2B, 2C) while the capsule (2A, 2B, 2C) is rotated relative to the optical reading arrangement (100) in the centrifugal cell (3) and generating an output signal representative of the code; wherein the beverage preparation machine is 15 configured to compute the feedback signal using an output signal of the optical reading arrangement (100) representative of at least part of a code of a capsule (2A, 2B, 2C) read by the optical reading arrangement (100).

14 Claims, 6 Drawing Sheets

(58) Field of Classification Search
USPC .......................................................... 426/232
See application file for complete search history.

(56) References Cited

U.S. PATENT DOCUMENTS

| | | |
|---|---|---|
| 10,667,646 B2 | 6/2020 | de Graaff et al. |
| 2011/0052761 A1 | 3/2011 | Yoakim et al. |
| 2011/0189362 A1 | 8/2011 | Denisart et al. |
| 2013/0247772 A1 | 9/2013 | Agon et al. |
| 2014/0023754 A1 | 1/2014 | Abegglen et al. |

FOREIGN PATENT DOCUMENTS

| | | | |
|---|---|---|---|
| WO | 2014090965 | 6/2014 | |
| WO | WO-2014090965 A1 * | 6/2014 | ............... A23F 5/24 |

* cited by examiner

BEVERAGE PREPARATION SYSTEM

CROSS REFERENCE TO RELATED APPLICATIONS

The present application is a National Stage of International Application No. PCT/EP2018/085737, filed on Dec. 19, 2018, which claims priority to European Patent Application No. 17210544.7, filed on Dec. 22, 2017, the entire contents of which are being incorporated herein by reference.

FIELD OF THE INVENTION

The invention relates to a beverage preparation system. The invention relates in particular to a beverage preparation system comprising a beverage preparation system for preparing beverages by centrifugation of capsules and a capsule comprising a code readable while the capsule is driven in rotation along an axis of rotation.

BACKGROUND OF THE INVENTION

For the purpose of the present description, a "beverage" is meant to include any human-consumable liquid substance, such as coffee, tea, hot or cold chocolate, milk, soup, baby food or the like. A "capsule" is meant to include any pre-portioned beverage ingredient or combination of ingredients (hereafter called "ingredient") within an enclosing packaging of any suitable material such as plastic, aluminium, a recyclable and/or bio-degradable material and combinations thereof, including a soft pod or a rigid cartridge containing the ingredient.

Certain beverage preparation machines use capsules containing an ingredient to be extracted or to be dissolved and/or an ingredient that is stored and dosed automatically in the machine or else is added at the time of preparation of the drink. Certain beverage machines comprise liquid filling means that include a pump for liquid, usually water, which pumps the liquid from a source of water that is cold or indeed heated through heating means, e.g. a thermoblock or the like. Certain beverage preparation machines are arranged to prepare beverages by using a centrifugal extraction process. The principle mainly consists in providing beverage ingredient in a container of the capsule, feeding liquid in the capsule and rotating the capsule at elevated speed to ensure interaction of liquid with the ingredient while creating a gradient of pressure of liquid in the capsule, such pressure increasing gradually from the centre towards the periphery of the receptacle. As liquid traverses the ingredient (e.g., a coffee bed), dilution and/or extraction of the ingredient (e.g., extraction of the coffee compounds) takes place and a liquid extract is obtained that flows out at the periphery of the capsule.

Typically, a range of capsules of different types containing different ingredients (e.g., different coffee blends) with specific characteristics may be offered to the user, to prepare a variety of different beverages (e.g., different coffee types) with a same machine. The characteristics of the beverages can be varied by varying the content of the capsule (e.g., coffee weight, different blends, etc.) and by adjusting key machine parameters such as, for example but not exclusively, the supplied liquid volume or temperature, the rotation speed, the pressure pump. In certain beverage preparation systems, the type of capsule inserted in the beverage machine is identified by a machine-readable code to enable the preferably automatic adjustment of the brewing parameters to the inserted capsule type. The code may furthermore embed additional information, for example safety information like use-by date or production data like batch numbers.

WO2010/026053 for example describes a controlled beverage preparation machine using centrifugal forces. The capsule may comprise a barcode provided on an outside face of the capsule and which enables a detection by the beverage preparation machine of the type of capsule and/or the nature of ingredients provided within the capsule in order to apply a predefined extraction profile for the beverage to be prepared.

WO2011/141535 and WO2013/072239 relate to supports adapted to be associated with or be a part of a capsule for the preparation of a beverage. The supports comprise a section on which at least one sequence of symbols is represented so that each symbol is sequentially readable by a reading arrangement of an external device, typically of a beverage preparation machine, while the capsule is driven in rotation along an axis of rotation. Each sequence preferably encodes a set of information related to the capsule and/or to the ingredient contained therein. Such code arrangement enables to make a large volume of coded information available, such as about 100 or more bits of redundant or non-redundant information per support, without using barcode readers having moving parts like a scanning element which may raise severe concerns in terms of reliability. Another advantage is also to be able to read the code by rotating the capsule while the capsule is in place, in a ready to brew position in the rotary capsule holder of the beverage preparation machine.

Preferably, beverage preparation machines using centrifugal forces rotate capsules at different speeds depending on the type of beverage, on the type of ingredient and/or on the beverage preparation phase. The capsule is for example rotated during a code reading phase at a speed of between 1 and 2'000 rpm, for example at 1'000 rpm. During an optional pre-wetting phase, which would typically take place at the beginning of a beverage preparation cycle, liquid such as water is supplied to the capsule, which is maintained static or is rotated at relatively low speed, preferably lower than 200 rpm, for example lower than 100 rpm. During the extraction phase, depending for example on the type of beverage to be delivered, the rotation speed can be comprised for example between 5'000 and 15'000 rpm. Such a beverage preparation machine thus typically comprises a variable speed motor for rotating the corresponding capsule at different speeds and control means for controlling the motor's rotation speed, using feedback from a rotary encoder measuring the rotation speed for example of the motor shaft. The rotary encoder however participates to the cost of the machine, and it may be subjected to dysfunctions, i.e. potentially impairing the machine's overall reliability.

Accordingly, an aim of the present invention is to provide a cost effective beverage preparation system for preparing beverages by centrifugation of capsules.

Another aim of the present invention is to provide a reliable beverage preparation system for preparing beverages by centrifugation of capsules.

SUMMARY OF THE INVENTION

These aims and other advantages are achieved by a beverage preparation machine comprising a centrifugal brewing unit for preparing a beverage by centrifugation of an ingredient contained in a capsule and mixed with a carrier liquid, the centrifugal brewing unit comprising a centrifugal cell for receiving such a capsule; driving means for rotating the centrifugal cell; a regulator for regulating a rotation speed of the centrifugal cell by controlling the driving means based on a feedback signal representative of a difference between a desired rotation speed and a measured rotation speed of a capsule rotated in the centrifugal cell; the machine further comprising: liquid supply means for supplying carrier liquid to the centrifugal brewing unit; an optical reading arrangement for reading a code on a periphery of a capsule while the capsule is rotated in the centrifugal cell relative to the optical reading arrangement and generating an output signal representative of the code; wherein the beverage preparation machine is configured to compute the feedback signal using an output signal of the optical reading arrangement representative of at least part of a code of a capsule read by said optical reading arrangement.

Using the signal generated by the optical code reading arrangement when reading the code on the capsule in order to regulate the rotation speed of the driving means allows avoiding the use of a dedicated encoder, thereby inducing a significant reduction of the costs and an increase of the reliability of the beverage preparation machine overall. The feedback signal to the regulator of the driving means is preferably computed using a value representative of a measured rotation speed of the capsule, which is derived from the output signal from the optical reading arrangement.

In embodiments, the beverage preparation machine is thus configured to determine, from the output signal of the optical reading arrangement representative of at least part of a read code of a capsule, a value representative of the measured rotation speed on the basis of a bit period of a single bit of the code. This value is for example determined as a number of samples of the output signal taken during the bit period. Alternatively, this value representative is determined as an average number of samples of the output signal taken during a plurality of bit periods of single bits.

These aims and other advantages are also achieved by a system comprising such a beverage preparation machine and a capsule comprising a code on a periphery thereof, the code being configured for being read by an optical reading arrangement of the machine while the capsule is being rotated relative to the optical reading arrangement. The code is preferably a binary code, for example a barcode.

These aims and other advantages are furthermore also achieved by a method for regulating the rotation speed of a capsule in a beverage preparation machine for preparing a beverage by centrifugation of an ingredient contained in a capsule and mixed with a carrier liquid, the method comprising the steps of: reading at least part of a code of a capsule with an optical reading arrangement of the machine while the capsule is rotated by the beverage preparation machine relative to the optical reading arrangement; computing a feedback signal representative of a difference between a desired rotation speed and a measured rotation speed of the capsule using an output signal of the optical reading arrangement representative of the read code part; feeding the feedback signal back to a regulator for regulating the driving means of the beverage preparation machine in order to adjust the rotation speed of the capsule.

In embodiments, the method further comprises the step of gradually ramping up or down the rotation speed of the capsule until a previously calibrated condition of the driving means is reached that corresponds to a rotation speed of the capsule relatively close to the desired rotation speed.

The code is preferably a binary code, for example a barcode.

Preferably, a value representative of the measured rotation speed is determined from the output signal of the optical reading arrangement on the basis of a bit period of a single bit of said code. The value is for example determined as a number of samples of the output signal during said bit period. Alternatively, the value is determined as an average number of samples of the output signal during a plurality of bit periods of single bits of the read code part.

BRIEF DESCRIPTION OF THE FIGURES

The invention will be better understood thanks to the following detailed description of several embodiments with reference to the attached drawings, in which.

DETAILED DESCRIPTION OF THE INVENTION

Figure 1:
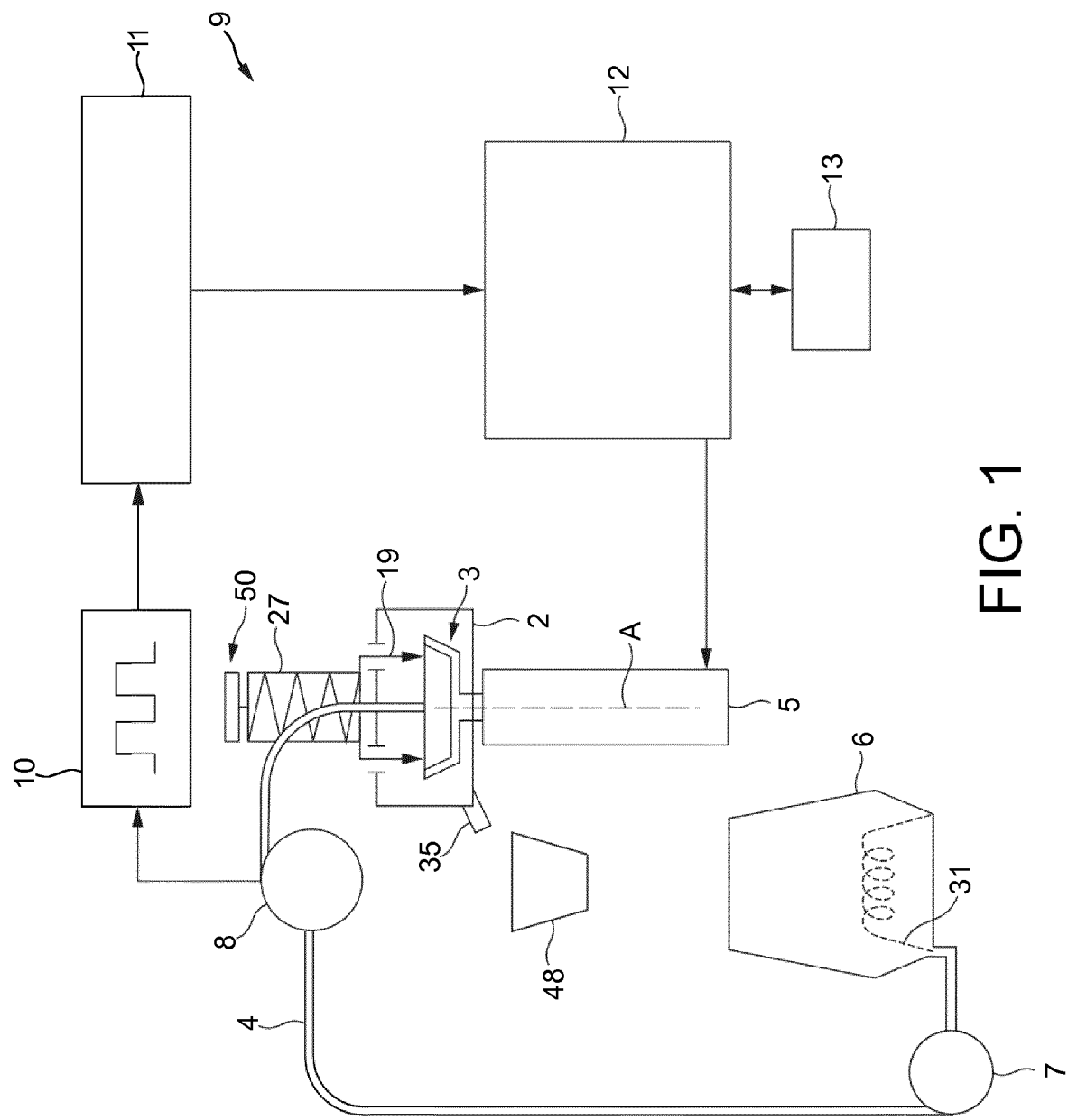
FIG. 1 illustrates the basic principle of the centrifugal extraction.

FIG. 1 schematically illustrates an embodiment of a beverage preparation machine 1 according to the invention.

The beverage preparation machine 1 comprises a centrifugal brewing unit 2 for preparing a beverage by centrifugation of an ingredient contained in a capsule and mixed with a carrier liquid. The centrifugal brewing unit 2 comprises a centrifugal cell 3 for rotating a capsule after and/or while a carrier liquid, typically water, is injected in the capsule and mixes with the ingredient contained therein. The centrifugal cell 3 for example comprises a capsule holder for receiving a capsule. The centrifugal cell 3 is connected to driving means 5 such as a rotary motor for rotating the centrifugal cell around a rotation axis A. The centrifugal brewing unit 2 comprises a collecting part and an outlet 35. A receptacle 48 can be disposed below the outlet 35 to collect the extracted beverage. In embodiments, the centrifugal brewing unit 2 comprises a flow restriction means 19 to control the flow of brewed beverage leaving the capsule during centrifugation.

The machine 1 further comprises liquid supply means, such as for example a liquid reservoir 6 and a fluid circuit 4, for supplying a carrier liquid, typically water, to the centrifugal brewing unit 2. Preferably, the liquid supply means comprises heating and/or cooling means 31 provided in the reservoir 6 and/or along the fluid circuit 4 for heating and/or cooling the liquid supplied to the centrifugal brewing unit 2. The liquid supply means preferably further comprises a pump 7 in fluid connection with the reservoir 6, for forcing the liquid from the reservoir 6 into the fluid circuit 4 towards the centrifugal brewing unit 2. In embodiments, the liquid supply means further comprise a flow meter such as a flow-metering turbine 8, for providing a measurement of the flow rate of liquid supplied to the centrifugal brewing unit 2. A counter 11 is for example connected to the flow-metering turbine 8 to receive and analyse impulse data 10 generated by the flow-metering turbine 8. The analysed data is then transferred to a processor 12 of the machine's control unit 9. Accordingly, the flow rate of the liquid within the fluid circuit 4 can be determined in real-time.

The machine's control unit 9 preferably controls the overall functioning of the beverage preparation machine 1, by controlling, for example but not exclusively, the pump 7, the heating and/or cooling means 31, the driving means 5, etc.

A user interface 13 is preferably provided to allow a user to input information and/or commands that are transmitted to the control unit 9 of the beverage preparation machine 1.

Figure 3A:
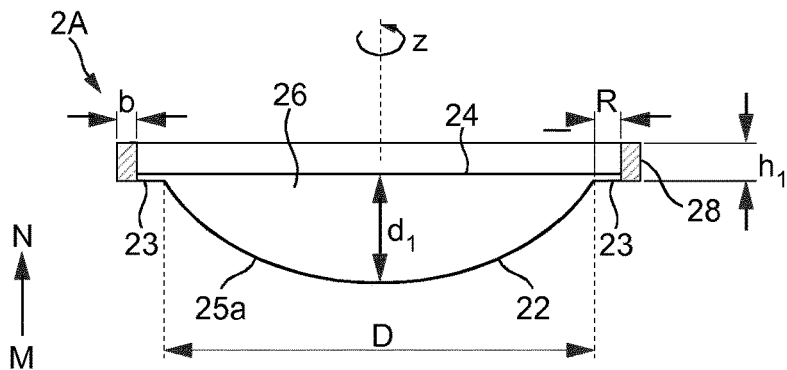
FIG. 3a, 3b, 3c illustrate an embodiment of a set of capsules according to the invention.
Figure 3B:
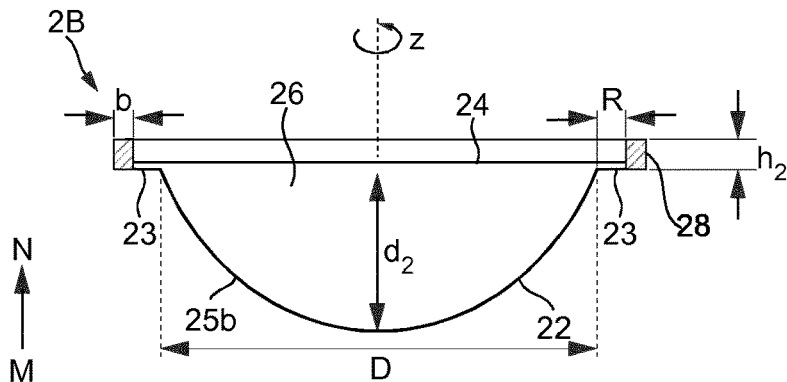
Figure 3C:
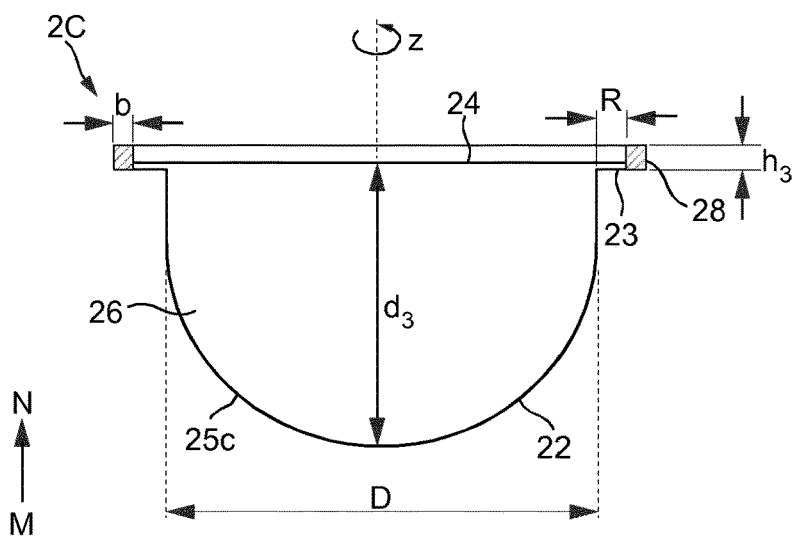

FIGS. 3*a*, 3*b* and 3*c* show examples of different capsules 2A, 2B, 2C for use with the machine of the invention. According to the illustrated embodiment, the capsules 2A, 2B, 2C preferably comprise a body 22 having a cup-like shape and a rim 23 extending from its upper side wall, and a lid 24 attached to the rim 23. The lid 24 is for example a perforable membrane or an aperture wall. The lid 24 and the body 22 thus form an enclosure or ingredient compartment 26. As illustrated in the figures, the lid 24 is preferably attached to the body 22 onto an inner annular portion R of the rim 23 that is for example between 1 to 5 mm wide.

In the illustrated embodiment, the rim 23 is horizontal. In other embodiments, the rim may have other configurations. The rim may for example be slightly bended. The rim 23 of the capsules preferably extends outwardly in a direction essentially perpendicular (as illustrated) or for example slightly inclined (if bended as aforementioned) relative to the axis of rotation Z of the corresponding capsule. The axis of rotation Z represents the axis of rotation during centrifugation of the capsule 2A, 2B, 2C in the centrifugal brewing unit 2 and in particular coincides with the axis of rotation A of the centrifugal cell 3 when the capsule 2A, 2B, 2C is in the capsule holder.

The illustrated embodiment is an exemplary but in no way limiting embodiment. The capsules, and in particular the capsule body, can take various different shapes and configurations within the frame of the invention.

The body 22 of the respective capsule 2A, 2B, 2C preferably has a single convex portion 25*a*, 25*b*, 25*c* of variable depth, respectively, $d_1$, $d_2$, $d_3$. In embodiments, the portion 25*a*, 25*b*, 25*c* is for example a truncated or a partially cylindrical portion.

In the illustrated embodiment, the capsules 2A, 2B, 2C have different volumes. However, they preferably have a same insertion diameter D. FIG. 3*a* for example shows a small volume capsule 2A whereas FIGS. 3*b* and 3*c* show larger volume capsules 2B, 2C. The insertion diameter D is for example determined at the line of intersection between the lower surface of the rim 23, i.e. the surface of the rim 23 opposed to the lid 24, and the upper portion of the body 22. In other embodiments, however, the insertion diameter common to the different capsules may be another reference diameter, located for example at another location of the capsule's body.

The small volume capsule 2A preferably contains an amount of ingredient, e.g., ground coffee, smaller than the amount contained in the larger volume capsules 2B, 2C. The small capsule 2A is for example intended for the preparation of a short coffee, for example a ristretto or espresso coffee, having a volume of between 10 ml and 60 ml with an amount of ground coffee comprised between 4 and 8 grams. The larger capsule 2B is for example intended for the preparation of a medium-size coffee having typically a volume of between 60 and 120 ml and the largest capsule 2C is for example intended for the preparation of a long coffee having typically a volume of between 120 and 500 ml. The medium-size coffee capsule 2B for example contains an amount of ground coffee comprised between 6 and 15 grams and the long-size coffee capsule 2C for example contains an amount of ground coffee of between 8 and 30 grams.

In addition, the capsules may contain different blends of roast and ground coffee or coffees of different origins and/or having different roasting and/or grinding characteristics.

The capsule 2A, 2B, 2C is preferably designed for rotating around its rotation axis Z. The rotation axis Z preferably crosses the center of the lid 24 in a direction perpendicular to the surface of the lid 24. The lid 24 for example has the form of a disk. The rotation axis Z furthermore preferably exits at the center of the bottom of the body. A circumference of the capsule 2A, 2B, 2C is defined as a circular path located on the capsule 2A, 2B, 2C and having the rotation axis Z as a reference axis. The circumference can be on the lid 24 or on the body 22, for example on the flange-like rim 23. The lid 24 may be impervious to liquid before insertion of the capsule in the machine 1, or it may be pervious to liquid by means of small openings or pores provided in its center and/or periphery.

Hereafter, the lower surface of the rim 23 refers to the section of the rim 23 that is located outside the ingredient compartment or enclosure 26 formed by the body 22 and the lid 24, and is visible when the capsule 2A, 2B, 2C is viewed from the side where its body 22 extends, i.e. the side of the rim 23 opposed to the side to which the lid 24 is attached.

Figure 2B:
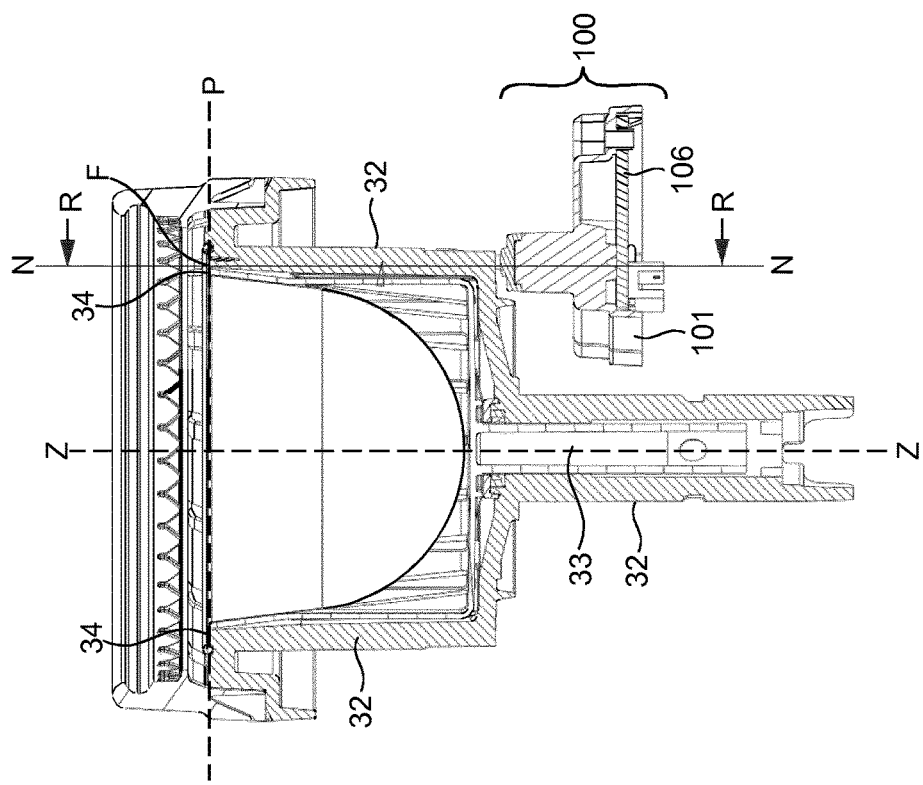
FIGS. 2a, 2b illustrate an embodiment of a centrifugal cell with a capsule holder.
Figure 2A:
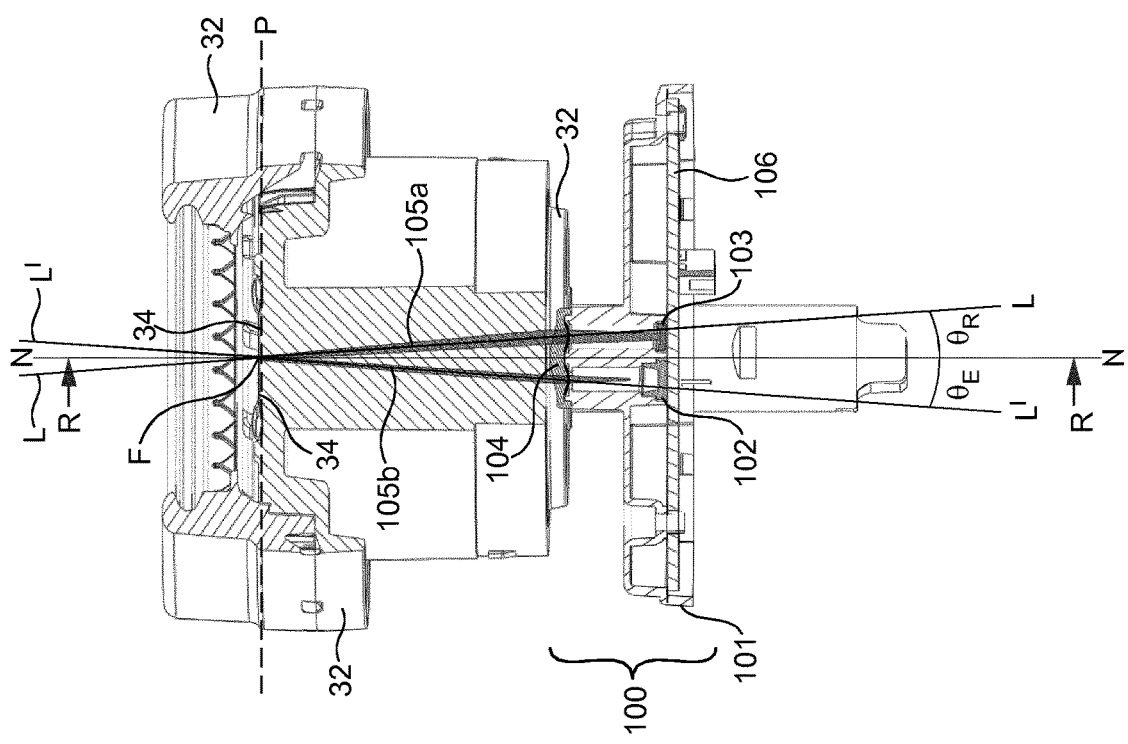

An embodiment of the centrifugal cell 3 of the machine of the invention, with a capsule holder 32, is illustrated in FIGS. 2*a* and 2*b*. The capsule holder 32 for example comprises a generally cylindrical or conical cavity with an upper opening for inserting a capsule side walls, for example a circular side wall, and a bottom wall closing the cavity. The opening preferably has a diameter slightly larger than the insertion diameter of the capsule. The outline of the opening for example fits the outline of the capsule's rim for the capsule to rest on the edge of the opening when the capsule is inserted in the capsule holder 32. The rim of the capsule thus at least partly rests on a receiving part 34 of the capsule holder 32. In embodiments, the bottom of the capsule holder 32 for example comprises a cylindrical shaft 33 aligned with the rotation axis Z of the capsule when the capsule is inserted in the capsule holder 32. The shaft 33 preferably connects the capsule holder 32 to the driving means, typically the rotary motor, of the beverage preparation machine to rotate the capsule holder 32 around the rotation axis Z.

An optical reading arrangement 100 is also schematically illustrated in FIGS. 2*a* and 2*b*. The optical reading arrangement 100 is for example configured to deliver an output signal comprising information related to a level of reflectivity of a circumference of a capsule leaning on the receiving part 34 of the capsule holder 32, for example of a circumference located on the lower surface of the rim of the capsule. The optical reading arrangement 100 is thus for example configured to perform optical measurements of the surface of the lower surface of the rim through the capsule holder 32, for example through a side wall of the capsule holder 32. Alternatively, the output signal may contain differential information, for instance differences of reflectivity over time, or contrast information. The output signal may be analog, for example a voltage signal varying with the information measured over the time. The output signal may be digital, for example a binary signal comprising numerical data of the information measured over the time.

In the embodiment of FIGS. 2a and 2b, the optical reading arrangement 100 comprises a light emitter 103 for emitting a source light beam 105a and a light receiver 102 for receiving a reflected light beam 105b.

Typically the light emitter 103 is a light-emitting diode or a laser diode, emitting for example an infrared light, for example a light with a wavelength of 850 nm. Typically, the light receiver 103 is a photodiode, adapted to convert a received light beam into a current or voltage signal, the intensity of the current or voltage typically depending on the intensity of the received light beam.

Preferably, the reading arrangement 100 further comprises processing means 106 including a printed circuit board embedding a processor, sensor signal amplifier, signal filters and circuitry for coupling said processing means 106 to the light emitter 103, the light receiver 102 and to the control unit 9 of the beverage preparation machine of the invention.

The light emitter 103, the light receiver 102 and the processing means 106 are preferably maintained in a fixed position by a support 101, which is for example directly or indirectly rigidly fixed to the frame of the machine of the invention. The reading arrangement 100 thus stays into its position during a beverage preparation process and is not driven into rotation, contrary to the capsule holder 32 and the capsule.

In embodiments, the light emitter 103 is disposed such that the source light beam 105a is generally oriented along a line L crossing at a fixed point F a plane P comprising the receiving part 34 of the capsule holder 32, said plane P having a normal line N passing through the point F.

The fixed point F determines an absolute position within the centrifugal cell 3 where the source light beam 105a is intended to hit a reflective surface: the position of the fixed point F within the machine of the invention remains unchanged when the capsule holder 32 is rotated. The reading arrangement may comprise focusing means 104, using for example holes, lenses and/or prisms, to make the source light beam 105a converging more efficiently towards the fixed point F and thus towards a corresponding point of the lower surface of the lid of a capsule positioned into the capsule holder 32. In particular, the source light beam 105 may be focused so as to illuminate a disc centered sensibly on the fixed point F.

In embodiments, the optical reading arrangement 100 is for example configured such that the angle $\theta_E$ between the line L and the normal line N is comprised between 2° and 10°, and in particular between 4° and 5° as shown in FIG. 2a. As a consequence, when a reflecting surface is disposed at the point F, the reflected light beam 105b is generally oriented along a line L', crossing the fixed point F, the angle $\theta_R$ between the line L' and the normal line N being comprised between 2° and 10°, and in particular between 4° and 5° as shown in FIG. 2a. The light receiver 102 is disposed on the support 101 so as to at least partly gather the reflected light beam 105b, generally oriented along the line L'. The focusing means 104 may also be arranged to make the reflected light beam 105b concentrating more efficiently onto the receiver 102. In the embodiment illustrated in FIG. 2a, 2b, the point F, the line L and the line L' are co-planar. In other embodiments, the point F, the line L and the line L' are not co-planar: for instance, the plane passing through the point F and the line L and the plane passing through the point F and the line L' are positioned at an angle of sensibly 90°, eliminating direct reflection and allowing a more robust optical reading arrangement with less noise.

The capsule holder 32 is for example adapted to allow the partial transmission of the source light beam 105a along the line L up to the point F. For instance, the side wall of the capsule holder 32 is configured to be non-opaque to the light emitted by the light emitter 103, for example to infra-red light. The side wall is for example made of a plastic based material which is translucent to infra-red and has entry surfaces allowing infra-red light to enter.

As a consequence, when a capsule is positioned in the capsule holder 32, the source light beam 105a hits the bottom part of the rim of said capsule at point F, before forming the reflected light beam 105b. In this embodiment, the reflected light beam 105b passes through the wall of the capsule holder up to the receiver 102.

The section of the lower surface of the rim of a capsule positioned into the capsule holder 32, which is illuminated at the point F by the source light beam 105a, changes over time when the capsule holder 34 is driven into rotation. So, a complete revolution of the capsule holder 32 is required for the source light beam 105a to successively illuminate the entire circumference of the lower surface of the rim.

An output signal of the light receiver 102 is for example computed or generated by measuring over time the intensity of the reflected light beam 105b received by the light receiver 102, and possibly by comparing its intensity to that of the source light beam 105a. The output signal is for example computed or generated by determining the variation over time of the intensity of the reflected light beam 105b, in particular while the capsule is rotating.

The capsule preferably comprises at least one code support located on at least part of a circumference of the capsule. In the illustrated embodiment, the code support is for example located on the lower surface of the rim of the capsule. The code support is part of or attached to the capsule. Symbols having different optical properties, for example different reflectivity properties, are formed on the code support for forming an optically readable code. The symbols are preferably arranged in at least one sequence, said sequence encoding a set of information related to the capsule and/or to the ingredient contained therein. Typically, each symbol corresponds to a specific binary value: a first symbol having for example a low reflectivity may represent a binary value of '0', whereas a second symbol having for example a high reflectivity may represent a binary value of '1', or the converse.

As explained further below, the symbols are arranged on the code support such that they are successively readable by the optical reading arrangement 100 while the capsule is driven in rotation on the capsule holder 32.

The set of information of at least one of the sequences may comprise information for recognizing a type associated to the capsule, and/or one or a combination of items of the following list:
  information related to parameters for preparing a beverage with the ingredient contained in the capsule, such as the optimal rotation speed, temperature of the water entering the capsule, temperature of the collector of the beverage outside the capsule, flow rate of the water entering the capsule, sequence of operations during the preparation process, etc.;
  information for locally and/or remotely retrieving parameters for preparing a beverage with the capsule, for example an identifier allowing the recognition of a type for the capsule;

information related to the manufacturing of the capsule, such a production batch identifier, a date of production, a recommended date of consumption, an expiration date, etc.;

information for locally and/or remotely retrieving information related to the manufacturing of the capsule.

Each set of information of at least one of the sequences may comprise redundant information. Hence, error-checking may be performed by comparison. This also improves the probability of a successful reading of the sequence, should some parts of the sequence be unreadable. The set of information of at least one of the sequences may also comprise information for detecting errors, and/or for correcting errors in said set of information. Information for detecting errors may comprise repetition codes, parity bits, checksums, cyclic redundancy checks, cryptographic hash function data, etc. Information for correcting errors may comprise error-correcting codes, forward error correction codes, and in particular, convolutional codes or block codes.

The symbols arranged in sequences are used to represent data conveying the set of information related to the capsule and/or the ingredient contained therein. For instance, each sequence may represent an integer number of bits. Each symbol may encode one or several binary bits. The data may also be represented by transitions between symbols. The symbols may be arranged in the sequence using a modulation scheme, for example a line coding scheme like a Manchester code.

Each symbol may be printed and/or embossed on the code support. Each symbol may be obtained by treating the code support to have a given roughness. The shape of the symbols may be chosen amongst the following non-exhaustive list: arc-shaped segments, segments which are individually rectilinear but extend along at least a part of the illuminated section, dots, polygons, geometric shapes.

In an embodiment, each sequence of symbols has a same fixed length, and more particularly has a fixed number of symbols. The structure and/or pattern of the sequence being known, it may ease the recognition of each sequence by the optical reading arrangement 100.

In an embodiment, at least one preamble symbol is represented in the section, so as to allow the determination of a start and/or a stop position in the section of each sequence. The preamble symbol is chosen to be identified separately from the other symbols. It may have a different shape and/or different physical characteristics compared with the other symbols. Two adjacent sequences may have a common preamble symbol, representing the stop of one sequence and the start of the other one.

In an embodiment, at least one of the sequences comprises symbols defining a preamble subsequence, so as to allow the determination of a position of the symbols in said sequence that encode the set of information related to the capsule and/or the ingredient contained therein. The symbols defining a preamble may encode a known reserved series of bits, for example '10101010'.

In an embodiment, the preamble symbols and/or the preamble subsequences comprise information for authentifying the set of information, for example a hash code or a cryptographic signature.

The symbols are distributed sensibly on at least $\frac{1}{8}^{th}$ of the circumference of the capsule, preferably on the entire circumference of the capsule. The code may comprise successive arc-shaped segments. The symbols may also comprise successive segments which are individually rectilinear but extend along at least a part of the circumference.

The sequence is preferably repeated along the circumference in order to ensure a reliable reading. The sequence is for example repeated at least twice on the circumference. Preferably, the sequence is repeated three to six times on the circumference. Repetition of the sequence means that the same sequence is duplicated and the successive sequences are positioned in series along the circumference so that upon a 360-degree rotation of the capsule, the same sequence can be detected or read more than one time.

Figure 4:
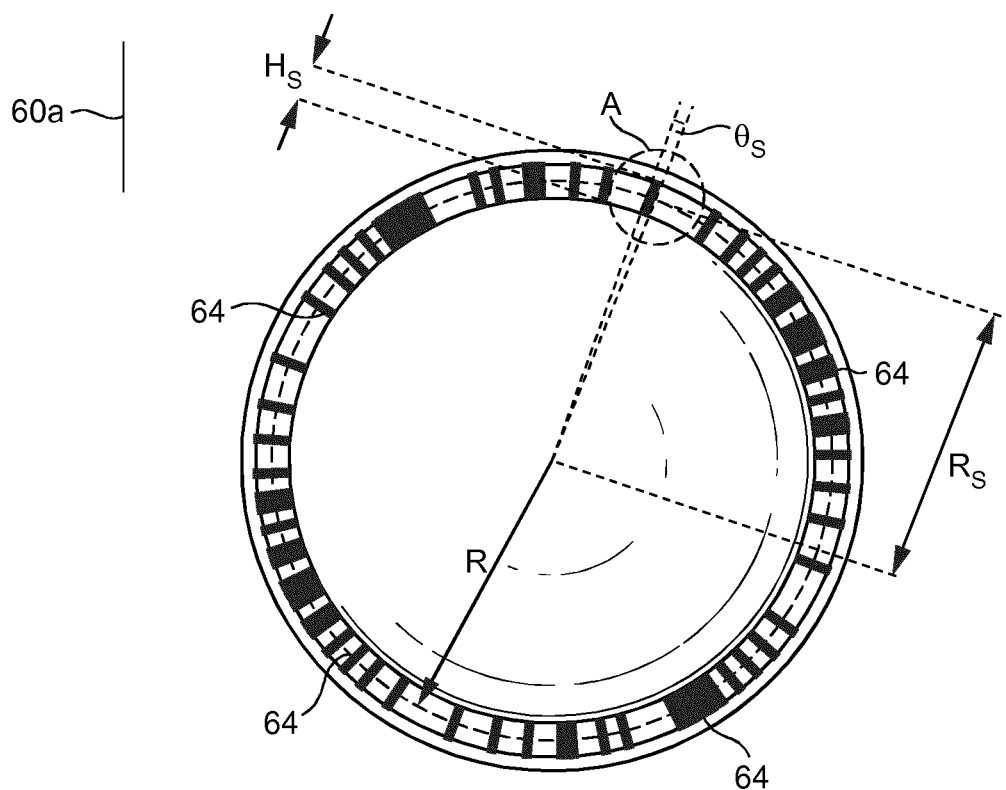
FIG. 4 illustrates an embodiment of a code support according to the invention.
Figure 4:
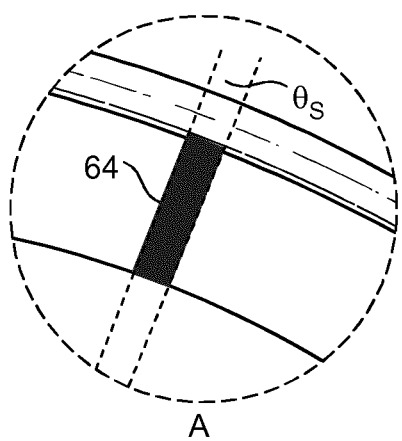

Referring to FIG. 4, an embodiment 60a of a code support is illustrated. The code support 60a occupies a defined width of the rim 23 of the capsule. The rim 23 of the capsule for example comprises an inner annular portion forming the code support 60a and an outer (non-coded) curled portion. In other embodiments, the full width of the rim may be occupied by the code support 60a, in particular if the lower surface of the rim is substantially flat. This location of the code support is particularly advantageous since it offers both a large area for the symbols 64 to be disposed and is less prone to damages caused by the processing module of the beverage preparation machine, in particular by the pyramidal plate, and to ingredients projections. As a consequence, the amount of coded information and the reliability of the reading are both improved. In the illustrated embodiment, the code support 60a comprises 160 symbols, each symbol encoding one bit of information. The symbols being contiguous, each symbol has an angular length $\theta_s$ of 2.25° (360° divided by 160). In other embodiments, the code support for example comprises 140 symbols, each symbol having an angular length $\theta_s$ of 2.5714° (360° divided by 140). Other numbers of symbols per circumference of the code support 60a are however possible within the frame of the invention, depending for example on the amount of information to be encoded and/or on the resolution of the code reading arrangement.

Figure 5:
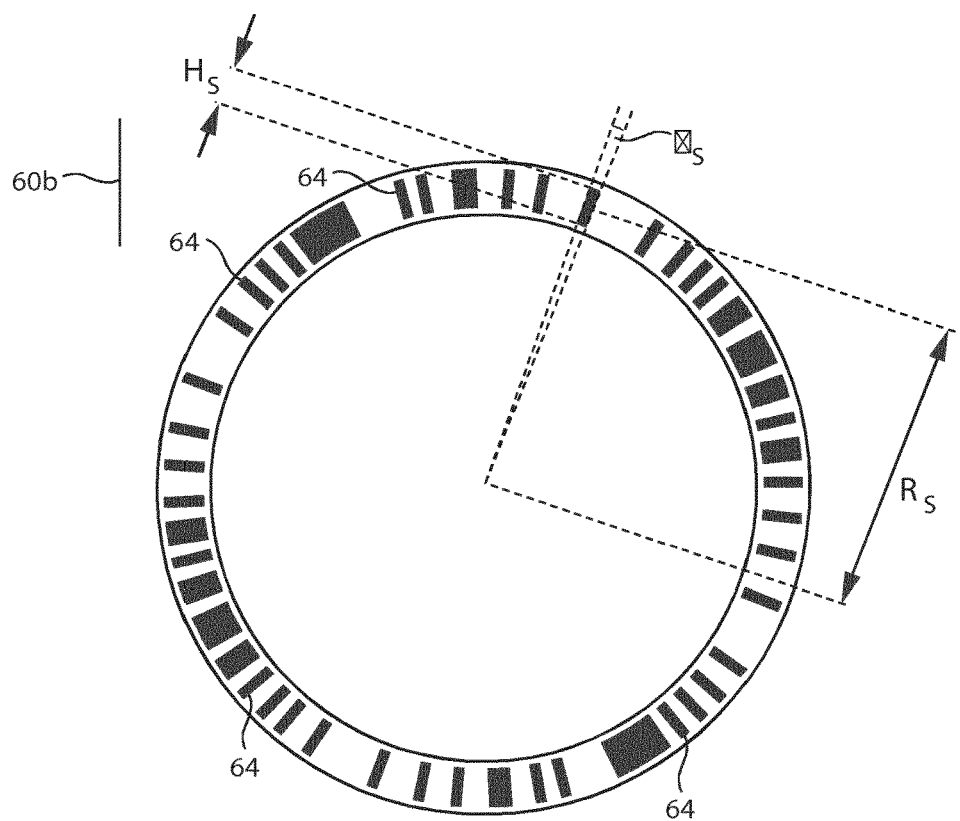
FIG. 5 illustrates an alternate position of the sequence on the capsule, in particular, when placed on the underside of the rim of the capsule, and the capsule fitted into a capsule holder of the extraction device.

Referring to FIG. 5, an embodiment 60b of a code support is illustrated in planar view. The code support 60b is adapted to be associated with a capsule, so as to be driven in rotation when the capsule is rotated around its axis Z by the centrifugal unit 2. The receiving section of the capsule is the lower surface of the rim of the capsule. As illustrated on FIG. 5, the code support 60b is for example a ring having a circumferential part on which the at least one sequence of symbols 64 is represented, such that the user can position it on the circumference of the capsule before introducing the capsule into the brewing unit of the beverage machine. Consequently, a capsule without embedded means for storing information can be modified by mounting such a support 60b so as to add such information. When the support is a separate part, it may be simply added on the capsule, preferably without additional fixing means, the user ensuring that the code support 60b is correctly positioned when the capsule enters the centrifugal brewing unit, or the forms and the dimensions of the code support 60b preventing it from moving relatively to the capsule once mounted. In embodiments, the code support 60b comprises additional fixing means for rigidly fixing said code support 60b to the receiving section of the capsule, like glue or mechanical means, to help the code support 60b staying fixed relatively to the capsule once mounted. As also mentioned, the code support 60b may also be a part of the rim itself such as integrated to the structure of the capsule.

Each symbol is adapted to be read by the optical reading arrangement 100 when the capsule is positioned into the capsule holder 32 and when at least a part of said symbol is aligned with the source light beam 105a at point F (FIGS. 2a and 2b). More particularly, each symbol presents a level of reflectivity of the source light beam 105a varying with the value of said symbol. Each symbol has defined reflective and/or absorbing properties of the source light beam 105a depending on the encoded value, preferably a binary value "0" or "1".

Since the optical reading arrangement 100 is adapted to measure only the characteristics of the illuminated section of the code support, i.e. the section of the code support located at point F, the capsule has to be rotated by the driving means until the source light beam 105a has successively illuminated all the symbols comprised in the code in order to read the entire code. Typically, the rotation speed while reading the code is comprised between 0.1 and 2'000 rpm. Preferably, the illuminated portion of the symbol is significantly smaller than the smallest dimension of the symbol in order to allow a robust and binary reading of the code. Preferably, the illuminated portion is a circular spot having a diameter, which is at most equal to half of the smallest dimension of the symbol.

Figure 6:
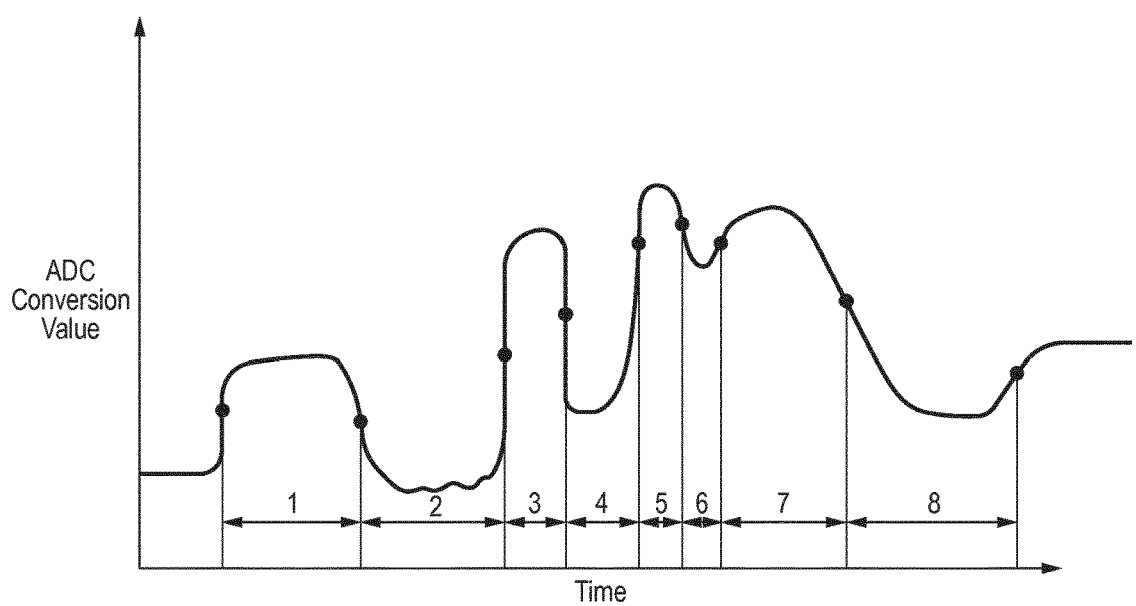
FIG. 6 shows an example of a typical signal curve produced by a light receiver of an optical reading arrangement of the machine of the invention when reading a portion of a code while a capsule is being driven in rotation in the beverage preparation machine at a constant speed.

FIG. 6 shows an example of a typical signal curve produced by a light receiver of the optical reading arrangement of the machine of the invention when reading a portion of a code while the capsule is being driven in rotation at a constant speed. Using a signal processing algorithm, signal noise is filtered and slopes are detected. The halfway point of each slope is then marked and the time period between each of these points is saved.

While the code is being read, the rotation speed is preferably fixed, for example at 1000 rpm. The "square" signal duration produced by reading a single bit, or bit period $T_{Bit}$, is thus known and is a function of the capsule's rotation speed and of the angular length $\theta_s$ of the corresponding symbol:

$$T_{Bit}[s] = \frac{\theta_s[°]}{\text{Speed}\left[\frac{°}{s}\right]} = \frac{\theta_s[°]}{6 * \text{Speed}[\text{rpm}]}$$

If, for example, the code comprises 140 contiguous symbols of equal length distributed on the entire periphery of the code support, the angular length of each symbol is equal to:

$$\theta_s = \frac{360}{140} = 2.5714°$$

The bit period $T_{Bit}$ resulting from reading such a symbol while the capsule is being rotated at a speed of 1000 rpm, is thus for example:

$$T_{Bit} = \frac{2.5714}{6 * 1000} \cong 429 \, \mu s$$

Figure 7:
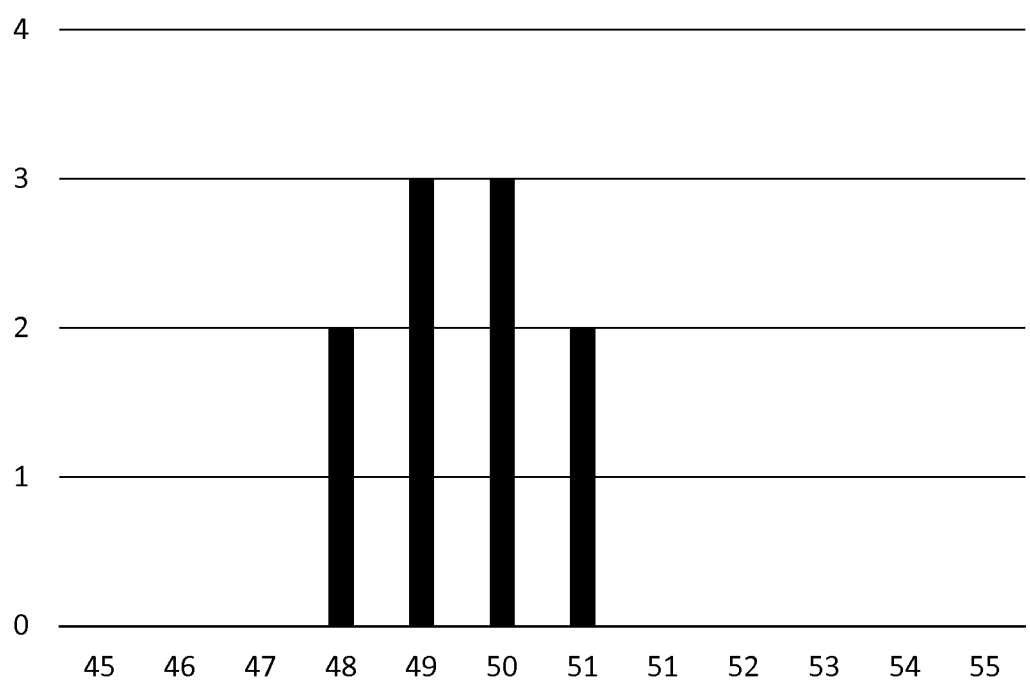
FIG. 7 is an example of a histogram assembling measured values of samples per bit for single bits of a read portion of the code.

By analyzing the time periods between slopes and comparing these time periods to the known bit period $T_{Bit}$, the content of the signal samples can be interpreted and transformed into binary data. In the example of FIG. 7, the read code portion would for example be interpreted as "1100101011000". The binary data resulting from interpreting the signal produced by the optical reading arrangement while reading the code is then decoded by the control unit of the beverage preparation machine in order to retrieve the corresponding information.

According to the invention, the rotation speed of the capsule is furthermore regulated using at least some of the time periods measured by the decoding algorithm as explained above. According to the invention, the rotation speed of the capsule is regulated in particular using one or more of the measured bit periods $T_{Bit}$, i.e. one or more of the measured time periods corresponding to a single bit.

Indeed, the rotation speed of the capsule may be calculated as:

$$\text{Speed}[\text{rpm}] = \frac{\theta_s[°]}{6 * T_{Bit}[s]}$$

In order to achieve a robust measurement of the bit period $T_{Bit}$, the sampling frequency of the signal produced by the optical reading arrangement is preferably chosen high enough for allowing a high resolution in measuring the bit period. The sampling frequency is for example chosen to guarantee a number $n_{samples}$ of samples per bit period $T_{Bit}$. In embodiments, the sampling frequency is for example set to guarantee approximately fifty samples per bit period $T_{Bit}$ ($n_{samples} \cong 50$). The sampling is furthermore preferably carried out over a number of bits $n_{Bits}$ small enough for the regulation to be fast enough not to provoke oscillations, and big enough to ensure that at least one single bit, i.e. a bit with no adjacent bit of the same value, is included in the measured bit sequence. In embodiments, the sampling duration is for example set to allow the sampling of twenty bits ($n_{Bits}=20$).

The relationships between the sampling frequency and sampling duration and the desired rotation speed may be expressed as:

$$F_{sampling}[\text{Hz}] = \frac{n_{samples}}{T_{Bit}[s]} = n_{samples} * \frac{6 * \text{Speed}[\text{rpm}]}{\theta_s[°]}$$

$$T_{sampling}[s] = n_{Bits} * T_{Bit}[s] = n_{Bits} * \frac{\theta_s[°]}{6 * \text{Speed}[\text{rpm}]}$$

In embodiments, the sampling frequency and/or the sampling duration are modified dynamically, for example by the control unit of the machine of the invention, as a function of the desired rotation speed.

Table 1 below summarizes examples of sampling durations and sampling frequencies that allow a reliable measurement of the capsule's rotation speed at different desired rotation speeds. In these examples, the following parameters were set to $\theta_s=2.5714°$, $n_{samples}=50$ and $n_{Bits}=20$.

TABLE 1

| Desired speed [rpm] | Sampling Frequency [Hz] | Sampling Period [µs] | Sampling Duration [ms] | Bit period [µs] |
|---|---|---|---|---|
| 500 | 58.25 | 17.17 | 17.17 | 858 |
| 1000 | 116.5 | 8.58 | 8.58 | 429 |
| 2000 | 233 | 4.29 | 4.29 | 214 |
| 3000 | 349.5 | 2.86 | 2.86 | 143 |
| 4000 | 466 | 2.15 | 2.15 | 107 |
| 5000 | 583.5 | 1.72 | 1.72 | 85 |
| 6000 | 699 | 1.43 | 1.43 | 71 |

According to the invention, the rotation speed of the capsule is thus preferably regulated using the same algorithm as the algorithm used for decoding the code. Preferably, a parameter of the driving means that drives the capsule in rotation, for example the rotation speed of an electric rotary motor, is controlled by a regulator, for example a PID regulator, whose feedback signal is directly related to the error between the measured bit period and the expected bit period. Typically, if the feedback signal is representative of a measured bit period shorter than the expected bit period, the regulator will modify the parameter of the driving means in order to decrease the capsule's rotation speed, whereas if the feedback signal is representative of a measured bit period longer than the expected bit period, the regulator will modify the parameter of the driving means in order to increase the capsule's rotation speed.

In embodiments, the feedback signal to the regulator is for example computed by measuring the difference between the actual number of samples per bit and the target number of samples per bit $n_{samples}$, thereby avoiding conversions from sample count per code bit to code bit period in time units. All the sample counts for each single bit detected during the sampling time are for example averaged to find the average sample count and compare this value to the target sample count $n_{samples}$, which would give the regulator error value.

In embodiments, after a sampling duration covering for example a 20 bit time interval, the obtained data is assembled and the mean value of samples per bit is calculated. An exemplary set of such obtained data is illustrated in the histogram chart of FIG. 7, where the number of samples per bit are reported on the horizontal axis, while the number of bits is reported on the vertical axis. In the illustrated example, the average number of samples per bit is 49.5. The error factor that is fed back to the regulator is thus for example 50−49.5=0.5. The regulator receiving this error factor will thus increase the speed of the driving means in order to obtain, in a next sampling phase, an average number of samples per bit closer to the expected value of 50 samples per bit.

As explained above, the number of bits $n_{Bits}$ measured during a sampling period is preferably chosen big enough to ensure that at least one single bit is included in each sampled bit sequence. The resolution expected from the method of the invention in the worst case scenario of obtaining only one valid measurement of a single bit during the sampling duration can be calculated as follows. In case that only one single bit is measured, the measurement resolution is +/−1 sampling period. The resolution is thus calculated as:

$$\frac{\Delta\text{Speed[rpm]}}{\text{Speed[rpm]}} = \frac{\text{Speed}_{meas} - \text{Speed}_{exp}}{\text{Speed}_{exp}} =$$

$$\frac{\frac{\theta_s}{6*(T_{Bit} \pm T_{sample})} - \frac{\theta_s}{6*(T_{Bit})}}{\frac{\theta_s}{6*(T_{Bit})}} = \frac{T_{Bit}}{(T_{Bit} \pm T_{sample})} - 1$$

where $\text{Speed}_{meas}$ is the measured speed, $\text{Speed}_{exp}$ is the expected speed, $T_{Bit}$ is the expected bit period at the expected speed, and $T_{sample}$ is the sampling period at the expected speed.

In the case for example where $n_{samples}$=50, i.e. $T_{Bit}$=50*$T_{sample}$:

$$\frac{\Delta\text{Speed}}{\text{Speed}} = \frac{T_{Bit}}{(T_{Bit} \pm T_{sample})} - 1 =$$

-continued $$\frac{50 * T_{sample}}{(50 \pm 1) * T_{sample}} - 1 = \frac{50}{(50 \pm 1)} - 1 = \pm 0.02 = \pm 2\%$$

With such parameters, at least a precision of ±2% is thus achieved in measuring the rotation speed of the capsule according to the invention when the rotation speed is close to the desired rotation speed. The method of the invention thus allows achieving a precise regulation of the rotation speed of the capsule, even in case that only one valid bit is detected during a sampling time.

The measurement precision of the method however decreases during acceleration or deceleration phases, such that the measurement of the speed during these phases may become unreliable. Accordingly, when the rotation of the capsule has to be set to a new desired rotation speed, for example at the beginning of a beverage preparation process and/or between two beverage preparation phases, the rotation speed is preferably gradually ramped up or down by gradually bringing the driving means to a previously calibrated condition corresponding to a rotation speed relatively close to the desired rotation speed. The driving means is for example an electric motor, which is gradually brought to a rotation speed relatively close to the desired rotation speed by gradually varying the PWM duty cycle of a motor drive up to a previously calibrated value. After the ramp phase, the speed measurement of the invention using the code on the capsule is activated along with the corresponding regulator, for example a PID regulator, in order to precisely regulate the rotation speed of the capsule and bring it to the desired rotation speed.

In embodiments, the beverage preparation process comprises at least two phases, each implying the rotation of the capsule at a specific rotation speed. When an unused capsule is inserted in the beverage preparation machine and beverage preparation is started by the user, the beverage preparation machine for example starts the beverage preparation process with a code reading phase. The capsule is thus brought into rotation by the machine's driving means at a fixed predetermined speed, for example at a rotation speed of between 1 and 2000 rpm, for example at a rotation speed of 1000 rpm, allowing the optical reading arrangement to reliably reading the code formed on a code support of the capsule. As explained above, the rotation speed is preferably gradually ramped up to a speed close to the desired rotation speed, and then maintained at the desired rotation speed while the code is being read, using the regulation method of the invention. Once the code is read, the beverage preparation process for example enters an extraction phase, during which a carrier liquid, for example water, is injected in the rotating capsule and the resulting beverage is extracted from the capsule. During the extraction phase, the capsule is rotated at a specific rotation speed preferably determined by the control unit of the beverage preparation machine on the basis of the information read from the code of the capsule, for example at a rotation speed of 2000 to 6000 rpm, depending typically from the type of beverage to be prepared and/or from the ingredient contained in the capsule.

Optionally, the beverage preparation process may comprise additional preparation phases requiring the rotation of the capsule at other desired fixed rotation speeds and during which the rotation speed of the capsule is regulated using the method of the invention. Such preparation phases may for example include:

a pre-wetting phase, which would typically take place at the beginning of the beverage preparation process, but preferably after the code reading phase, and during which a carrier liquid such as water is supplied to the capsule, which is for example rotated at relatively low speed, preferably lower than 500 rpm, even more preferably lower than 200 rpm, for example lower than 100 rpm;

a final phase during which the capsule is rotated at a speed higher than the rotation speed used during the previous extraction phase, in order to extract all the beverage remaining in the capsule;

an additional extraction phase at a speed different than the speed used during the first extraction phase, in order for example to achieve a particular characteristics of the beverage, for example a particular texture and/or the extraction of a particular ingredient.

Preferably, beverage preparation parameters including for example, but not exclusively: the number and/or types of preparation phases; the duration of each preparation phase; the desired rotation speed of the capsule during each preparation phase; the volume and/or flow of liquid, for example water, injected in the capsule during each preparation phase; are retrieved by the control unit of the machine from reading the code of the capsule during the code reading phase. The parameters are for example at least partially encoded as binary data within the code, and/or retrieved from a database, for example a database stored within the beverage preparation machine or on a remote device.

The invention claimed is:

1. A beverage preparation machine comprising:
a centrifugal brewing unit configured for preparing a beverage by centrifugation of an ingredient contained in a capsule, the ingredient being mixed with a carrier liquid, the centrifugal brewing unit comprising:
a centrifugal cell configured for receiving the capsule;
a drive configured for rotating the centrifugal cell;
a regulator configured for regulating a rotation speed of the centrifugal cell by controlling the drive based on a feedback signal representative of a difference between a desired rotation speed and a measured rotation speed of the capsule rotated in the centrifugal cell;
a liquid supply member for supplying the carrier liquid to the centrifugal brewing unit; and
an optical reading arrangement configured for reading a code on a periphery of the capsule while the capsule is rotated in the centrifugal cell relative to the optical reading arrangement, the optical reading arrangement generating an output signal representative of at least part of the code;
the beverage preparation machine is configured to compute the feedback signal using the output signal of the optical reading arrangement representative of the at least part of the code of the capsule read by the optical reading arrangement.

2. A beverage preparation machine comprising:
a centrifugal brewing unit configured for preparing a beverage by centrifugation of an ingredient contained in a capsule, the ingredient being mixed with a carrier liquid, the centrifugal brewing unit comprising:
a centrifugal cell configured for receiving the capsule;
a drive configured for rotating the centrifugal cell;
a regulator configured for regulating a rotation speed of the centrifugal cell by controlling the drive based on a feedback signal representative of a difference between a desired rotation speed and a measured rotation speed of the capsule rotated in the centrifugal cell;
a liquid supply member for supplying the carrier liquid to the centrifugal brewing unit; and
an optical reading arrangement configured for reading a code on a periphery of the capsule while the capsule is rotated in the centrifugal cell relative to the optical reading arrangement, the optical reading arrangement generating an output signal representative of at least part of the code;
the beverage preparation machine is configured to compute the feedback signal using the output signal of the optical reading arrangement representative of the at least part of the code of the capsule read by the optical reading arrangement and to determine, from the output signal of the optical reading arrangement representative of the at least part of the code of the capsule read by the optical reading arrangement, a value representative of the measured rotation speed based on a bit period of a single bit of the code.

3. The beverage preparation machine according to claim 2, configured to determine the value representative of the measured rotation speed as a number of samples of the output signal during the bit period.

4. The beverage preparation machine according to claim 2, configured to determine the value representative of the measured rotation speed as an average number of samples of the output signal during a plurality of bit periods of single bits.

5. A system comprising a beverage preparation machine, the beverage preparation machine comprising:
a centrifugal brewing unit configured for preparing a beverage by centrifugation of an ingredient contained in a capsule, the ingredient being mixed with a carrier liquid, the centrifugal brewing unit comprising:
a centrifugal cell configured for receiving the capsule;
a drive configured for rotating the centrifugal cell;
a regulator configured for regulating a rotation speed of the centrifugal cell by controlling the drive based on a feedback signal representative of a difference between a desired rotation speed and a measured rotation speed of the capsule rotated in the centrifugal cell;
a liquid supply member configured for supplying the carrier liquid to the centrifugal brewing unit; and
an optical reading arrangement configured for reading a code on a periphery of the capsule while the capsule is rotated in the centrifugal cell relative to the optical reading arrangement, the optical reading arrangement generating an output signal representative of at least part of the code;
the beverage preparation machine is configured to compute the feedback signal using the output signal of the optical reading arrangement representative of the at least part of the code of the capsule read by the optical reading arrangement and the capsule comprising the code on the periphery thereof, the code being configured for being read by the optical reading arrangement of the beverage preparation machine while the capsule is being rotated relative to the optical reading arrangement.

6. The system according to claim 5, wherein the code is a barcode.

7. A system comprising a beverage preparation machine, the beverage preparation machine comprising:
a centrifugal brewing unit configured for preparing a beverage by centrifugation of an ingredient contained in a capsule, the ingredient being mixed with a carrier liquid, the centrifugal brewing unit comprising:

a centrifugal cell configured for receiving the capsule;
a drive configured for rotating the centrifugal cell;
a regulator configured for regulating a rotation speed of the centrifugal cell by controlling the drive based on a feedback signal representative of a difference between a desired rotation speed and a measured rotation speed of the capsule rotated in the centrifugal cell;
a liquid supply member configured for supplying the carrier liquid to the centrifugal brewing unit; and
an optical reading arrangement configured for reading a code on a periphery of the capsule while the capsule is rotated in the centrifugal cell relative to the optical reading arrangement, the optical reading arrangement generating an output signal representative of at least part of the code;
the beverage preparation machine is configured to compute the feedback signal using the output signal of the optical reading arrangement representative of the at least part of the code of the capsule read by the optical reading arrangement and the capsule comprising the code on the periphery thereof, the code being configured for being read by the optical reading arrangement of the beverage preparation machine while the capsule is being rotated relative to the optical reading arrangement, wherein the code is a binary code.

8. A method for regulating a rotation speed of a capsule in a beverage preparation machine configured for preparing a beverage by centrifugation of an ingredient contained in the capsule, the ingredient being mixed with a carrier liquid, the method comprising the steps of:
reading at least part of a code of the capsule with an optical reading arrangement of the beverage preparation machine while the capsule is rotated by the beverage preparation machine relative to the optical reading arrangement;
computing a feedback signal representative of a difference between a desired rotation speed and a measured rotation speed of the capsule using an output signal of the optical reading arrangement representative of the at least part of the code; and
feeding the feedback signal back to a regulator configured for regulating a drive of the beverage preparation machine to adjust the rotation speed of the capsule.

9. The method according to claim 8, wherein the code is a barcode.

10. A method for regulating a rotation speed of a capsule in a beverage preparation machine configured for preparing a beverage by centrifugation of an ingredient contained in the capsule, the ingredient being mixed with a carrier liquid, the method comprising the steps of:
reading at least part of a code of the capsule with an optical reading arrangement of the beverage preparation machine while the capsule is rotated by the beverage preparation machine relative to the optical reading arrangement;
computing a feedback signal representative of a difference between a desired rotation speed and a measured rotation speed of the capsule using an output signal of the optical reading arrangement representative of the at least part of the code;
feeding the feedback signal back to a regulator configured for regulating a drive of the beverage preparation machine to adjust the rotation speed of the capsule; and
gradually ramping up or down the rotation speed of the capsule until a predefined calibrated condition of the drive is reached, the predefined calibrated condition corresponding to a predefined calibrated rotation speed of the capsule relatively close to the rotation speed.

11. A method for regulating a rotation speed of a capsule in a beverage preparation machine configured for preparing a beverage by centrifugation of an ingredient contained in the capsule, the ingredient being mixed with a carrier liquid, the method comprising the steps of:
reading at least part of a code of the capsule with an optical reading arrangement of the beverage preparation machine while the capsule is rotated by the beverage preparation machine relative to the optical reading arrangement, wherein the code is a binary code;
computing a feedback signal representative of a difference between a desired rotation speed and a measured rotation speed of the capsule using an output signal of the optical reading arrangement representative of the at least part of the code; and
feeding the feedback signal back to a regulator configured for regulating a drive of the beverage preparation machine to adjust the rotation speed of the capsule.

12. A method for regulating a rotation speed of a capsule in a beverage preparation machine configured for preparing a beverage by centrifugation of an ingredient contained in the capsule, the ingredient being mixed with a carrier liquid, the method comprising the steps of:
reading at least part of a code of the capsule with an optical reading arrangement of the beverage preparation machine while the capsule is rotated by the beverage preparation machine relative to the optical reading arrangement;
computing a feedback signal representative of a difference between a desired rotation speed and a measured rotation speed of the capsule using an output signal of the optical reading arrangement representative of the at least part of the code, wherein a value representative of the measured rotation speed is determined from the output signal of the optical reading arrangement representative of the at least part of the code of the capsule read by the optical reading arrangement based on a bit period of a single bit of the code; and
feeding the feedback signal back to a regulator configured for regulating a drive of the beverage preparation machine to adjust the rotation speed of the capsule.

13. The method according to claim 12, wherein the value representative of the measured rotation speed is determined as an average number of samples of the output signal during a plurality of bit periods of single bits.

14. A method for regulating a rotation speed of a capsule in a beverage preparation machine configured for preparing a beverage by centrifugation of an ingredient contained in the capsule, the ingredient being mixed with a carrier liquid, the method comprising the steps of:
reading at least part of a code of the capsule with an optical reading arrangement of the beverage preparation machine while the capsule is rotated by the beverage preparation machine relative to the optical reading arrangement;
computing a feedback signal representative of a difference between a desired rotation speed and a measured rotation speed of the capsule using an output signal of the optical reading arrangement representative of the at least part of the code, wherein a value representative of the measured rotation speed is determined as a number of samples of the output signal during a bit period; and feeding the feedback signal back to a regulator configured for regulating a drive of the beverage preparation machine to adjust the rotation speed of the capsule.

* * * * *